US007772752B2

(12) United States Patent
Nakamura et al.

(10) Patent No.: US 7,772,752 B2
(45) Date of Patent: Aug. 10, 2010

(54) PLASMA-JET SPARK PLUG

(75) Inventors: Toru Nakamura, Aichi (JP); Tomoaki Kato, Aichi (JP)

(73) Assignee: NGK Spark Plug Co., Ltd. (JP)

( * ) Notice: Subject to any disclaimer, the term of this patent is extended or adjusted under 35 U.S.C. 154(b) by 288 days.

(21) Appl. No.: 12/055,430

(22) Filed: Mar. 26, 2008

(65) Prior Publication Data

US 2008/0238281 A1 Oct. 2, 2008

(30) Foreign Application Priority Data

Mar. 29, 2007 (JP) ............................ 2007-088379
Dec. 26, 2007 (JP) ............................ 2007-334168
Feb. 14, 2008 (JP) ............................ 2008-033686

(51) Int. Cl.
*H01T 13/20* (2006.01)
*G01P 3/66* (2006.01)
*F02B 23/04* (2006.01)

(52) U.S. Cl. ...................... 313/141; 313/142; 313/118; 123/169 EL

(58) Field of Classification Search ......... 313/118–145; 123/169 R, 169 EL, 32, 41, 310
See application file for complete search history.

(56) References Cited

U.S. PATENT DOCUMENTS

| | | | | |
|---|---|---|---|---|
| 4,388,549 | A | 6/1983 | Bensman | 313/138 |
| 4,514,657 | A | 4/1985 | Igashira et al. | 313/130 |
| 4,713,574 | A | 12/1987 | Scott | 313/130 |
| 2006/0137642 | A1 | 6/2006 | Artmann et al. | 123/169 |

FOREIGN PATENT DOCUMENTS

| | | | |
|---|---|---|---|
| JP | 55166092 | | 11/1980 |
| JP | 56081490 | | 7/1981 |
| JP | 57015379 | A | 1/1982 |
| JP | 2072577 | | 3/1990 |
| JP | 2006294257 | | 10/2006 |
| JP | 2007141786 | | 6/2007 |
| JP | 2008045449 | | 2/2008 |

*Primary Examiner*—Sikha Roy
*Assistant Examiner*—Tracie Green
(74) *Attorney, Agent, or Firm*—Kusner & Jaffe

(57) ABSTRACT

A plasma-jet spark plug comprising an insulator and a ground electrode which are disposed apart from each other in an axial direction (O) to prevent a damage of the insulator. The spark plug is capable of reducing an energy loss of the ejected plasma by defining a dimension of a clearance between the insulator and the ground electrode whereby deterioration of the ignitability of the plasma-jet spark plug is prevented.

7 Claims, 7 Drawing Sheets

PLASMA-JET SPARK PLUG

FIELD OF THE INVENTION

The present invention relates to a plasma-jet spark plug producing plasma to ignite an air-fuel mixture in an internal-combustion engine.

BACKGROUND OF THE INVENTION

A spark plug is widely used in an automotive internal-combustion engine to ignite an air-fuel mixture by a spark discharge. In response to the recent demand for high engine output and fuel efficiency, it is desired that the spark plug has an increased ignitability to exhibit a higher ignition-limit air-fuel ratio and to achieve proper lean mixture ignition and quick combustion.

Such a plasma-jet spark plug includes a center electrode and a ground electrode (external electrode), which is connected with a metal shell, defining a spark discharge gap therebetween, and an insulator (housing) made of ceramic or the like and surrounding the spark discharge gap so as to form a small discharge space, so-called a cavity (chamber). A spark discharge is generated through application of a high voltage between the center electrode and the ground electrode, and dielectric breakdown caused at this time enables to feed electric current with a relatively low voltage. Thus, a further energy supply causes a phase transition of the discharge to eject a plasma formed within the cavity from an opening portion (external electrode hole) called an orifice for ignition of an air-fuel mixture (e.g., see Patent Document 1 or 2).

A plasma-jet spark plug disclosed in Patent Document 1 or 2 has a cylindrical metal shell in which a front end portion thereof is closed to serve as a ground electrode and form an orifice in the center. Further, a front end face of the insulator accommodated in the external electrode comes in contact with an inner face of the ground electrode so that the orifice and the cavity are coaxially formed. In another form of the plasma-jet spark plug, the front end portion of the metal shell is joined to a separate ground electrode and define the orifice in the center of the ground electrode while the front end face of the insulator comes in contact to an inner face (inner side face) of the ground electrode (see Patent Document 1, FIG. 2).

[Patent Document 1] Japanese Patent Application Laid-Open (kokai) No. H2-72577.

[Patent Document 2] Japanese Patent Application Laid-Open (kokai) No. 2006-294257.

However, when an insulator and a metal shell is formed with a strict dimensional control in the manufacturing of a plasma-jet spark plug and a front end face of the insulator comes in contact with an inner face of the ground electrode as in the plasma-jet spark plug according Patent Document 1 or 2, the insulator can be damaged due to a difference in thermal expansion coefficient of the materials constituting the insulator, the metal shell and the ground electrode under the influence of thermal cycle at the time of use. On the other hand, when a large gap is formed between the front end face of the insulator and the inner face of the ground electrode resulting from a manufacturing tolerance, the plasma energy escapes into the gap, and the plasma is, therefore, not ejected into an intended direction, or the amount of plasma ejection (ejection length) is likely to decrease (be short) when the plasma formed within the cavity is ejected through the orifice. Although the insulator is securely accommodated in the metal shell by a crimping method, the insulator can be damaged due to a rise of internal stress when the front end face of the insulator is crimped while being strongly pressed to the inner face of the ground electrode resulting from a manufacturing tolerance of the insulator and the ground electrode.

The present invention is accomplished in view of the foregoing problems of the prior arts. An advantage of the present invention is to provide a plasma-jet spark plug in which an insulator and a ground electrode are disposed apart from each other in an axial direction so as to prevent a damage of the insulator, and the spark plug is capable of reducing an energy loss of the ejected plasma by defining a dimension of a clearance between the insulator and the ground electrode whereby a deterioration in an ignitability of the plasma-jet spark plug is prevented.

SUMMARY OF THE INVENTION

According to a first aspect there is provided a plasma-jet spark plug, comprising a center electrode and an insulator having an axial bore which extends in an axial direction. The insulator accommodates a front end face of the center electrode therein and holds the center electrode. A cavity is formed on the front end side of the insulator and assumes a concave shape defined by an inner circumference face of the axial bore and either a front end face of the center electrode or a plane surface including the front end face. A metal shell holds the insulator by surrounding a radial circumference of the insulator. The spark plug further comprises a ground electrode joined to the metal shell so as to be electrically connected thereto. The ground electrode is disposed on the front end side with respect to the insulator and has an opening portion to allow communicating between the cavity and the outside of the spark plug, wherein a plasma can be produced in the cavity along with a spark discharge between the center electrode and the ground electrode. The insulator and the ground electrode are disposed apart from each other in the axial direction, wherein the following relations are satisfied: $0<a<=0.5$ [mm] and $0.1<=S<=10$ [$mm^3$] where "a" is a dimension of a clearance between the insulator and the ground electrode in the axial direction; and "S" is a volume of the cavity.

In addition to the first aspect, in a plasma-jet spark plug according to a second aspect, the insulator and the metal shell are disposed apart from each other in a radial direction perpendicular to the axial direction such that the following relation is satisfied: $b<=1.1$ [mm] where "b" is a dimension of a clearance between the insulator and the metal shell in the radial direction perpendicular to the axial direction.

In addition to the second aspect and according to a third aspect, dimension "b" satisfies the relation $0.1<=b<=1.1$ [mm].

Further, according to a fourth aspect of the present invention, a plasma jet spark plug is provided having a center electrode and an insulator having an axial bore which extends in an axial direction. The insulator accommodates a front end face of the center electrode therein and holds the center electrode. A cavity is formed on the front end side of the insulator and assumes a concave shape defined by an inner circumference face of the axial bore and either a front end face of the center electrode or a plane surface including the front end face. A metal shell holds the insulator by surrounding a radial circumference of the insulator. A ground electrode is joined to the metal shell so as to be electrically connected thereto. The ground electrode is disposed on the front end side with respect to the insulator and has an opening portion for communicating between the cavity and the outside of the spark plug, wherein a plasma can be produced in the cavity along with a spark discharge between the center electrode and the ground electrode. Furthermore, at least either a joint portion of the metal shell joined to the ground electrode or the ground electrode is disposed apart from the insulator in the axial direction, wherein a first packing is disposed in a clearance between at least either a joint portion of the metal shell joined to the ground electrode or the ground electrode and the insulator so as to adhere thereto.

In addition to the composition of the fourth aspect, a plasma-jet spark plug according to a fifth aspect may include an insulator stepped portion formed so that a rear end side thereof has a lager diameter than a front end side thereof. The insulator stepped portion is formed in a portion of an outer circumference face of the insulator which is accommodated radially inward of a fitting portion provided on a front end side of the metal shell, wherein a metal fitting stepped portion bulging out in a radially inward direction of the metal shell is formed in an inner circumference face of the metal shell so as to face the insulator stepped portion, wherein a second packing is disposed between the insulator stepped portion and the metal fitting stepped portion so as to adhere thereto, and wherein a hardness of the second packing is higher than that of the first packing.

In addition to the composition of the fourth or fifth aspect, a plasma-jet spark plug according to a sixth aspect satisfies the following relations: $0<a<=0.8$ [mm] and $0.1<=S<=10$ [$mm^3$] where "a" is a dimension of a clearance in the axial direction between at least either the joint portion of the metal shell joined to the ground electrode or the ground electrode and the insulator; and "S" is a volume of the cavity.

In addition to the composition of any one of above aspects, a plasma-jet spark plug according to a seventh aspect satisfies the following relation: $1.0<=G<=3.0$ [mm] where "G" is a dimension of a gap between the center electrode and the ground electrode in the axial direction.

According to the plasma-jet spark plug of the first aspect, since there is a clearance (a first clearance) between the insulator and the ground electrode in the axial direction, any damage due to a difference in a thermal expansion coefficient therebetween is unlikely to occur when the insulator adheres to the ground electrode. Further, in the manufacturing process of the spark plug, since the first clearance (the dimension of the clearance in the axial direction is $a>0$ [mm]) can compensate manufacturing tolerances of the insulator and the ground electrode, the insulator is unlikely to be kept in the metal shell under pressure from the ground electrode. Therefore, the insulator is prevented from being damaged.

In such a plasma-jet spark plug having the first clearance, the volume S of the cavity satisfies the relation $0.1<=S<=10$ [$mm^3$]. Thus, the plasma-jet spark plug can maintain the minimum energy in the cavity required for ejecting the plasma from the opening portion, thereby preventing energy dispersion and enabling the plasma to be ejected from the cavity with a sufficient amount of energy. Further, since the first clearance dimension or first distance "a" satisfies the relation $0<a<=0.5$ [mm], the plasma energy is unlikely to leak into the first clearance on the way to the opening portion from the cavity. Therefore, an effective amount of plasma can be ejected from the opening portion to the outside of the spark plug, thereby achieving excellent ignitability.

According to the second aspect of the invention, when a dimension or distance "b" of a clearance (a second clearance) between the insulator and the metal shell in the radial direction perpendicular to the axial direction satisfies the relation $b<=1.1$ [mm], the entire volume of the clearance including the first clearance and the second clearance or distance "b" does not increase. Thus, it is unlikely that the plasma energy leaks into the first clearance and flows to the second clearance whereby substantial loss of the plasma energy is avoided on the way to the opening portion of the cavity. As a result, an effective amount of plasma can be ejected from the opening portion to the outside of the spark plug, which results in excellent ignitability.

Considering the individual plasma-jet spark plug, the dimension "b" is preferably as close to 0 as possible. However, when the dimension "b" is close to 0, the assembly of the insulator and the metal shell becomes difficult. Furthermore, each component constituting the plasma-jet spark plug tends to expand or contract due to thermal cycle at the time of use. For these reasons, as in the third aspect, the dimension "b" is preferably 0.1 [mm] or more. By specifying the lower limit of the dimension "b" to be 0.1 [mm] or more, damage to the plasma-jet spark plug due to expansion or contraction of the components can be reduced at the time of use.

According to the plasma-jet spark plug of the fourth aspect of the invention, since the first packing is disposed in the clearance (first clearance) formed between at least either the joint portion of the metal shell or the ground electrode and the insulator, the first clearance can be sealed by the first packing. Thus, it is unlikely that the plasma energy ejected from the cavity leaks into the first clearance on the way to the opening portion. As a result, an effective amount of plasma can therefore be ejected from the opening portion to the outside of the spark plug, and excellent ignitability can be obtained.

According to the fifth aspect of the invention, the hardness of the second packing used for holding the insulator in the metal shell is made higher than that of the first packing so that the first packing does not disturb the deformation of the second packing (a surface deformation of the second packing which improves the sealing effect). That is, in the manufacture process of the plasma-jet spark plug, when the metal shell is crimped to hold the insulator, the first packing is easily deformed by the crimping force and do not disturb the surface deformation of the second packing whereby the second packing can adhere to both metal shell and the insulator. Thus, the second packing can prevent the leakage of the combustion gas through the metal shell and the insulator. Further, the first packing can function as a shock absorber between the insulator and the ground electrode when the metal shell is crimped to hold the insulator therein. Therefore, the damage to the insulator can be prevented in the manufacture process of the plasma-jet spark plug.

According to the sixth aspect of the invention, when the volume S of the cavity satisfies the relation $0.1<=S<=10$ [$mm^3$], the plasma-jet spark plug can maintain the plasma energy in the cavity without dispersion thereof, and can eject the plasma from the cavity with a sufficient amount of energy. Further, since the first clearance dimension "a" satisfies the relation $0<a<=0.8$ [mm], it is unlikely that the plasma energy leaks from the cavity into the first clearance on the way to the opening portion. Therefore, an effective amount of the plasma can be ejected from the opening portion to the outside of the spark plug, thereby achieving excellent ignitability.

According to the seventh aspect of the invention, excellent ignitability can be obtained when the dimension G of a gap (spark discharge gap) between the center electrode and the ground electrode in the axial direction satisfies the relation $G<=3.0$ [mm]. Although the reason for this will be described later in Experiment 2, the ignitability is drastically dropped when the spark discharge gap dimension G exceeds 3.0 mm compared to the case when the spark discharge gap dimension G is 3.0 mm or less. On the other hand, when the spark discharge gap dimension G satisfies the relation $1.0<=G$ [mm], the depth of the cavity can fully be maintained and the plasma ejected from the cavity can assume an effective flame form, which improves the ignitability of the spark plug.

DETAILED DESCRIPTION OF PREFERRED EMBODIMENTS

Figure 1:
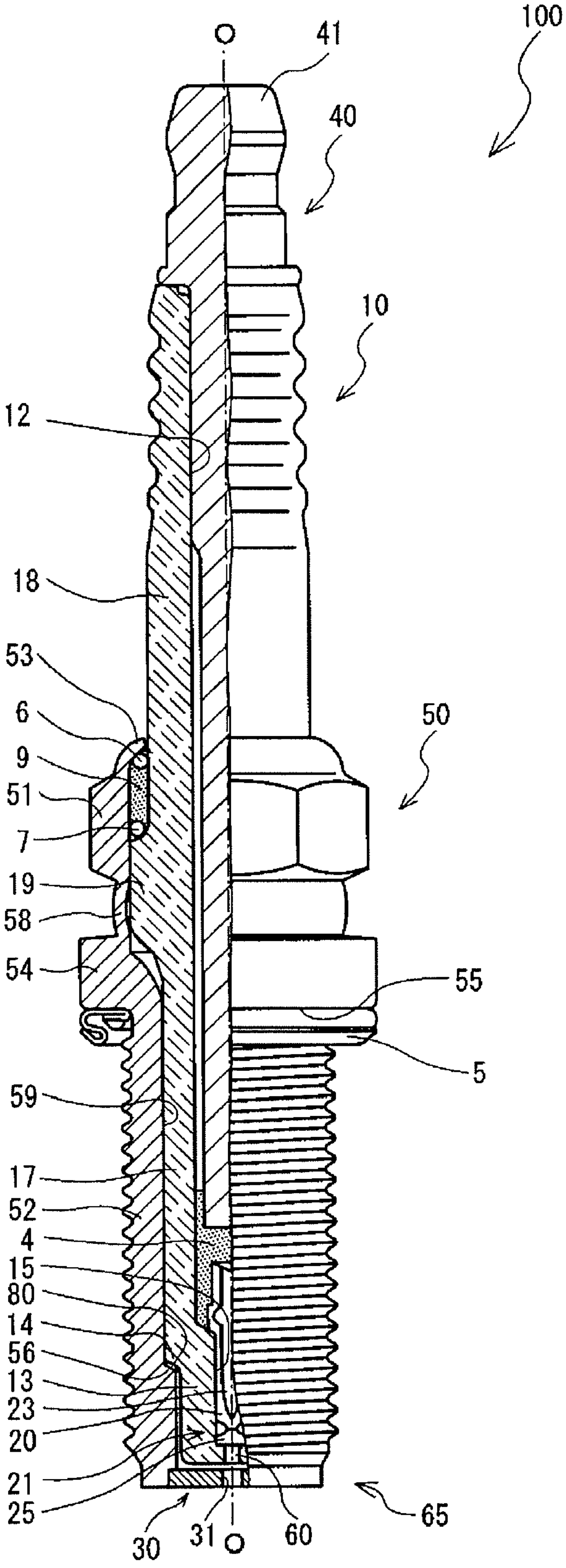
FIG. 1 is a partial section view of a plasma-jet spark plug 100 according to a first embodiment.
Figure 2:
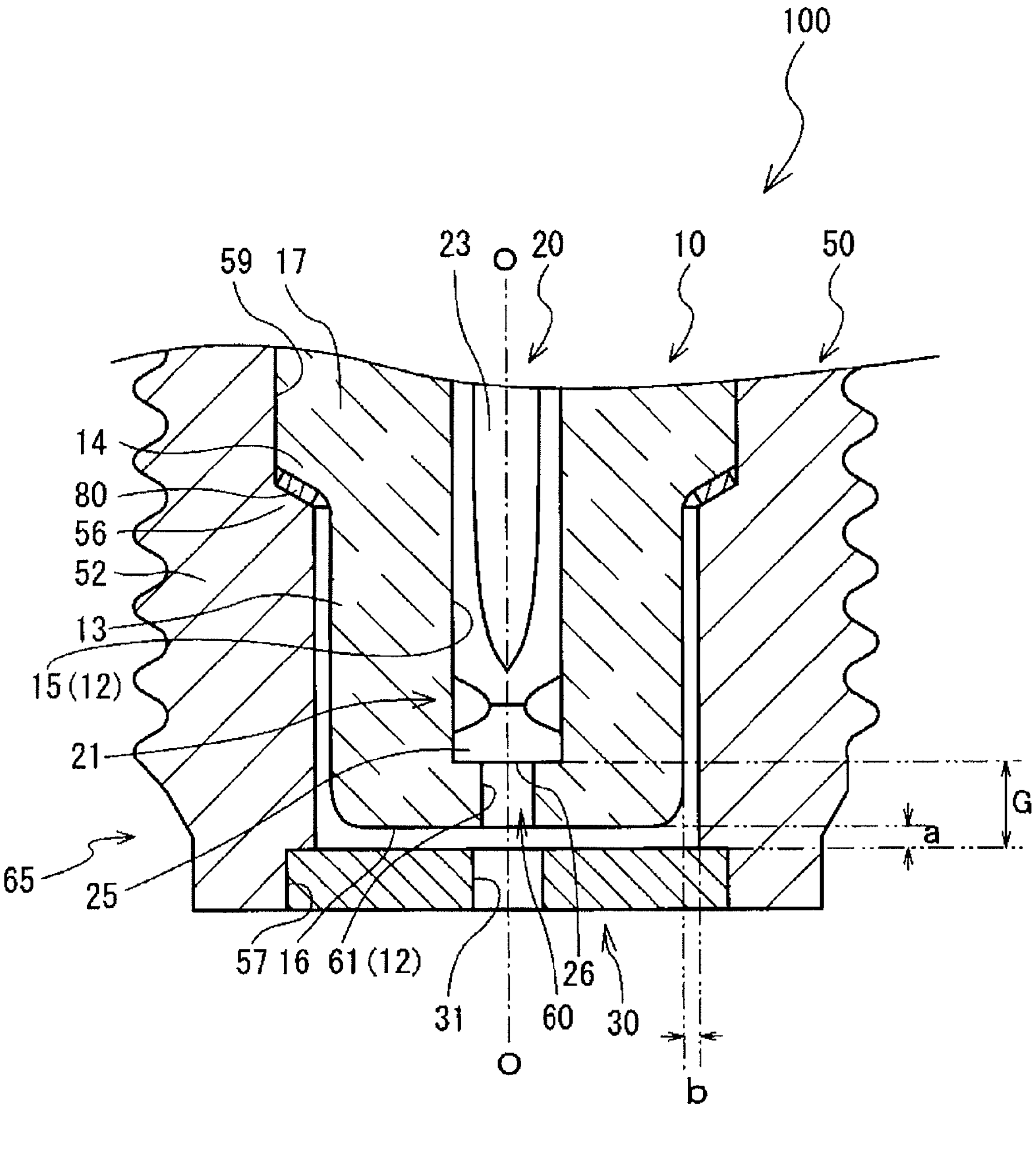
FIG. 2 is an enlarged section view of a front end portion of the plasma-jet spark plug 100 according to the first embodiment.

Referring now to the drawings wherein the showings are for the purpose of illustrating a preferred embodiment of the invention only, and not for the purpose of limiting same, a first embodiment of a plasma-jet spark plug according to the present invention will be described with reference to the drawings. First, with reference to FIGS. 1 and 2, an example of a composition of a plasma-jet spark plug 100 will be described. FIG. 1 is a partial cross section view of the plasma-jet spark plug 100. FIG. 2 is an enlarged cross section view showing a front-end portion of the plasma-jet spark plug 100. In the following description, an axial direction "O" of the plasma-jet spark plug 100 is regarded as the top-to-bottom direction in FIG. 1. A lower side of the drawing refers to a front end side of the plasma jet spark plug 100 and an upper side of the drawing refers to a rear end side of the plasma jet spark plug 100.

As shown in FIG. 1, the plasma-jet spark plug 100 according to the first embodiment is comprised of an insulator 10, a metal shell 50 that holds the insulator 10 therein, a center electrode 20 held in the insulator 10 in the axial direction "O", a ground electrode 30 welded to a front end portion 65 of the metal shell 50 and a metal terminal 40 formed in a rear end portion of the insulator 10.

The insulator 10 is a tubular insulating member including an axial bore 12 in the axial direction "O." Insulator 10 is made of sintered alumina or the like as is commonly known. A flange portion 19 having the largest outer diameter of insulator 10 is formed in a generally middle position with respect to the axial extension of the insulator 10, and a rear end side body portion 18 is formed on the rear end side therefrom. The rear end side body portion 18 has a bumpy surface (so-called corrugation) on an outer circumference face thereof so as to increase the surface of the insulator 10 and hence the distance along the surface between the metal shell 50 and the metal terminal 40. A front end side body portion 17 of insulator 10 having a smaller outer diameter than that of the rear end side body portion 18 is formed on the front end side with respect to the flange portion 19. A long or oblong leg portion 13 having a smaller outer diameter than that of the front end side body portion 17 is formed at a front end side with respect to the front end side body portion 17. A stepped portion 14 having a stepped form is provided between the long or oblong leg portion 13 and the front end side body portion 17. It is noted that the stepped portion 14 serves as an "insulator stepped portion" according to certain embodiments.

The inner circumference portion of the axial bore 12 in the region of the long leg portion 13 serves as an electrode holding region 15 and has an inner diameter smaller than those of the front end side body portion 17, the flange portion 19 and the rear end side body portion 18. The center electrode 20 is held in the electrode holding region 15. As shown in FIG. 2, the inner circumference of the axial bore 12 has a diameter which is further reduced at the front end side of the electrode holding region 15, with the reduced diameter portion serving there as a front hole portion 61. The front hole portion 61 is opened at a front end 16 of the insulator 10.

The center electrode 20 is a rod-shaped electrode and can be comprised of nickel-system alloys or the like such as INCONEL (trade name) 600 or 601 in which a metal core 23 comprised of copper or the like with excellent thermal conductivity is provided. A disk-shaped electrode tip 25 comprised of a noble metal or W (tungsten) is welded to a front end portion 21 of the center electrode 20 so as to be integrated with the center electrode 20. It is noted that the "center electrode" in the first embodiment includes the electrode tip 25 integrated with the center electrode 20.

As shown in FIG. 1, a rear end side of the center electrode 20 is flanged (made larger in diameter) and seated in a stepped portion of the electrode holding region 15 of the axial bore 12 for proper positioning of the center electrode 20 within the electrode holding region 15. Further, as shown in FIG. 2, a periphery edge or a periphery portion of a front end face 26 of the front end portion 21 of the center electrode 20 (i.e., a front end face 26 of the electrode tip 25 integrated with the center electrode 20 in the front end portion 21) is held in contact with a stepped portion formed between the electrode holding region 15 and the front hole portion 61, both of which have a different diameter. With this configuration, a cylindrical bottomed small-volume discharge gap is defined by an inner circumference face of the front hole portion 61 of the axial bore 12 and either the front end face 26 of the center electrode 20 or a plane surface including the front end face 26. In the plasma-jet spark plug 100, a spark discharge is performed in the spark discharge gap formed between the ground electrode 30 and the center electrode 20, and the spark discharge passes through the inside of the discharge gap. This discharge gap is called a cavity 60 in which plasma is formed and ejected to the outside of the spark plug through an opening of the front end 16 at the time of the spark discharge.

As shown in FIG. 1, the metal terminal 40 is electrically connected to the center electrode 20 in the front end side body portion 17 through a conductive seal material 4 of metal-glass composition provided in the axial bore 12. The seal material 4 does not only establish electrical conduction between the center electrode 20 and the metal terminal 40 but also fixes the center electrode 20 in the axial bore 12. The metal terminal 40 extends toward the rear side in the axial bore 12, and a rear end portion 41 of the metal terminal 40 projects from a rear end of the insulator 10 toward the outside of the spark plug. A high-voltage cable (not illustrated) is connected to the rear end portion 41 through a plug cap (not illustrated) so as to supply high voltage from a power supply unit (not illustrated).

Metal shell 50 shall now be described. The metal shell 50 is a cylindrical metal fitting for fixing the plasma-jet spark plug 100 to an engine head (not illustrated) of an internal-combustion engine. The metal shell 50 holds the insulator 10 in a cylindrical hole 59 and surrounds a peripheral region of the insulator 10 ranging from the rear end side body portion 18 to the long leg portion 13 of the insulator 10. The metal shell 50 is made of low-carbon-steel material and has a fitting portion 52 with a large diameter in a generally middle region to a front end side thereof. A male screw-like thread is formed on an outer circumference face of the fitting portion 52 so as to allow engagement with a female screw in a mounting hole (not illustrated) of the engine head. The metal shell 50 may be made of stainless steel, such as INCONEL (trade name), having an excellent heat resistance property.

Further, a flange-like seal portion 54 is formed on a rear end side of the fitting portion 52. An annular gasket 5, formed by bending a plate material, is disposed between the seal portion 54 and the fitting portion 52. The gasket 5 is deformed between a seat face 55 facing the front end of the seal portion 54 and a peripheral portion of the opening of the fitting hole (not illustrated) when the plasma-jet spark plug 100 is mounted on a mounting hole of an engine head. As a result, a gas seal is found between the plasma-jet spark plug 100 and the fitting hole to prevent a combustion gas from leaking through the fitting hole.

A tool engagement portion 51 is formed in the rear end side of the seal portion 54 to engage a plug wrench (not illustrated). A thin crimp portion 53 is formed on the rear end side with respect to the tool engagement portion 51, and a thin buckling portion 58 is formed between the tool engagement portion 51 and the seal portion 54. Further, annular rings 6, 7 are disposed between an inner circumference region extending from the tool engagement portion 51 to the crimp portion 53 and an outer circumference face of the rear end side body portion 18 of the insulator 10. Powdery talc 9 is filled between the annular rings 6 and 7.

As shown in FIG. 2, a stepped portion 56 is formed in the inner circumference face of the fitting portion 52 to thereby hold the stepped portion 14 of the insulator 10 through a second annular packing 80. The second annular packing 80 is made of, for example, a nickel material. As shown in FIG. 1, when an end portion of the crimp portion 53 is inwardly bent and crimped, the insulator 10 is pressed towards the front end side through the ring members 6, 7 and the talc 9. Prior to proceeding with the above crimping process, the buckling portion 58 is heated for a while, and at the same time of crimping, the buckling portion 58 receives the compression force and deforms like a swollen-shape, which increases the extent of the compression stroke of the buckling portion 58. With this configuration, the stepped portion 14 and the flange portion 19 of the insulator 10 are reliably sandwiched between the crimp portion 53 and the stepped portion 56 of the metal shell 50. As a result, the insulator 10 is securely integrated within the metal shell 50. A clearance, i.e., a gap, is defined between the inner circumference face of the cylindrical hole 59 of the metal shell 50 and an outer circumference face of the long leg portion 13 of the insulator 10, as shown in FIG. 2. The air-tightness between the metal shell 50 and the insulator 10 is established by the second packing 80 to prevent the combustion gas from leaking through the cylindrical hole 59. It is noted that the stepped portion 56 is equivalent to a "metal fitting stepped portion" according to certain embodiments.

The ground electrode 30 is provided in the front end portion 65 of the metal shell 50. The ground electrode 30 is made according to certain embodiments of a metal material having excellent heat resistance properties, such as a nickel-system alloy under the trade name of INCONEL 600 or 601. As shown in FIG. 2, the ground electrode 30 can assume a disk shape and has an opening (a through hole in the thickness direction thereof) called an orifice 31 located in the center. The ground electrode 30 is disposed at the front end side with respect to the front end 16 of the insulator 10. The thickness direction of the ground electrode 30 extends along the axial direction "O". The ground electrode 30 is engaged with an engagement portion 57, which is formed at an inner circumference face of the front end portion 65 of the metal shell 50 and disposed with respect to the insulator 10 to define a clearance between the ground electrode 30 and the insulator 10. An outer circumference edge of the ground electrode 30 is laser welded to the engagement portion 57 so as to be integrated with the metal shell 50. The orifice 31 of the ground electrode 30 is generally coaxially arranged with respect to the axial direction "O" so as to be aligned with the cavity 60 of the insulator 10. Orifice 31 establishes a communication between the cavity 60 and the outside air. It is noted that the orifice 31 is equivalent to an "opening portion" according to certain embodiments.

In the plasma-jet spark plug 100 formed in this way, when high voltage is applied to the spark discharge gap formed between the center electrode 20 and the ground electrode 30 during the operation of an internal-combustion engine, the insulation between the ground electrode 30 and the center electrode 20 breaks down, and a spark discharge occurs (also called a trigger discharge phenomenon). In this state, when additional energy is applied to the spark discharge gap, a high-energy plasma is formed within the small cavity 60 surrounded by the walls. The thus-produced high energy plasma is ejected in a flame form from the cavity 60 to the outside of the spark plug (i.e., a combustion chamber) through the orifice 31 of the ground electrode 30. Thereafter, the air-fuel mixture is ignited by the high-energy plasma discharge and combusted through flame kernel growth in the combustion chamber.

The plasma-jet spark plug 100 having such a configuration has a clearance (hereinafter referred to as a "first clearance" or first distance) between the ground electrode 30 and the front end 16 of the insulator 10. The first embodiment meets the relations $0<a<=0.5$ mm and $0.1<=S<=10$ $mm^3$ based on Experiment 1 mentioned later, where "a" is a dimension, for example thickness, of the first clearance and "S" is a volume of the cavity 60. When the volume S of the cavity 60 is larger than 10 $mm_3$, the plasma energy spreads within the cavity 60 whereby the amount of plasma energy ejected from the opening side decreases. As a result, the ignitability deteriorates (the flame length becomes short). When the first clearance dimension or first distance "a" is larger than 0.5 mm, the plasma energy produced in the cavity 60 leaks to the first clearance on the way to the orifice 31, thereby decreasing the amount of plasma energy. As a result, the ignitability of the plasma-jet spark plug 100 deteriorates. As mentioned above, when the relations $0<a<=0.5$ mm and $0.1<=S<=10$ $mm^3$ are satisfied, sufficient and excellent ignitability is obtained according to the results of Experiment 1.

The ground electrode 30 is joined to the engagement portion 57 of the metal shell 50 so as to be positioned against the metal shell 50. The front end 16 of the insulator 10 is positioned against the metal shell 50 in such a manner that the stepped portion 14 of the insulator 10 is supported by the stepped portion 56 of the metal shell 50 through the second packing 80. That is, the first clearance dimension "a" between the ground electrode 30 and the front end 16 of the insulator 10 is controlled by the amount of crimping of the crimp portion 53 and the thickness and/or hardness of the second packing 80 including the manufacturing tolerance.

The plasma-jet spark plug 100 has another clearance (hereinafter referred to as a "second clearance") connected to the first clearance and defined by the outer circumference face of the long leg portion 13 of the insulator 10 and the inner circumference face of the cylindrical hole 59 of the metal shell 50. The first embodiment specifies the relation 0.1<=b<=1.1 mm based on Experiment 2 mentioned later, where "b" is a dimension, for example thickness, of the second clearance. When the second clearance dimension "b" is larger than 1.1 mm, the volume of the entire clearance of the first clearance and the second clearance is increased. Thus, the plasma energy can leak from the first clearance and can easily flow to the second clearance, resulting in a substantial lost of plasma energy density and a reduction of the amount of plasma to be ejected. Consequently, the deterioration in the ignitability may occur. Further, considering the heat resistance of the individual plasma-jet spark plug, the second clearance dimension "b" is preferably as close to 0 as possible. However, when the second clearance dimension "b" is close to 0, the assembly of the insulator 10 and the metal shell 50 becomes difficult. Furthermore, each component constituting the plasma-jet spark plug 100 can expand or contract due to thermal cycle at the time of use. For this reason, the plasma-jet spark plug can be damaged when the second clearance dimension "b" reaches 0. As mentioned above, when the second clearance satisfies the relation 0.1<=b<=1.1 [mm], excellent ignitability is obtained without damaging the plasma-jet spark plug according the result of Experiment 2 mentioned later.

The first embodiment also specifies the relation 1.0<=G<=3.0 [mm] based on Experiment 2 (mentioned later), where "G" is a dimension or length of the spark discharge gap formed between the center electrode 20 and the ground electrode 30 in the axial direction. When the spark discharge gap dimension G is larger than 3.0 mm, the ignitability deteriorates. In order to solve this problem, high voltage is preferably applied so as to produce a spark discharge between the center electrode 20 and the ground electrode 30. However, with high voltage there is also a possibility that the insulator 10 may be damaged due to an excessive voltage supply. Further, a more expensive power supply system may be required. Considering the above-mentioned problems, the spark discharge gap dimension G is preferably 3.0 mm or less. On the other hand, if the spark discharge gap dimension G is less than 1.0 mm, the length of the cavity 60 (depth of the cavity 60) in the axial direction "O" cannot fully be maintained, and the ejected plasma does not assume the flame form. As a result, deterioration in the ignitability is likely to occur. As mentioned above, when the spark discharge gap dimension G satisfies the relation 1.0<=G<=3.0 mm, the spark discharge is reliably produced, thereby obtaining the excellent ignitability according to the results of Experiment 2 mentioned later.

In the above description of the plasma-jet spark plug 100, although the insulator 10 is held in the metal shell 50 by way of heat crimping, it is not necessary to use this method. For example, the crimping process may be conducted with a cold work, or an end of the crimp portion 53 may be directly or indirectly (through the packing or the like) pressed to thereby hold the insulator 10 without using the talc 9. As long as the insulator 10 is held, the method for holding the insulator is not limited. However, when a crimping process or the like is employed to press and hold the insulator 10 toward the front end in the axial direction "O", a heat crimping process as described above is effective in preventing damage of the insulator 10 during a manufacturing process of the spark plug.

Figure 3:
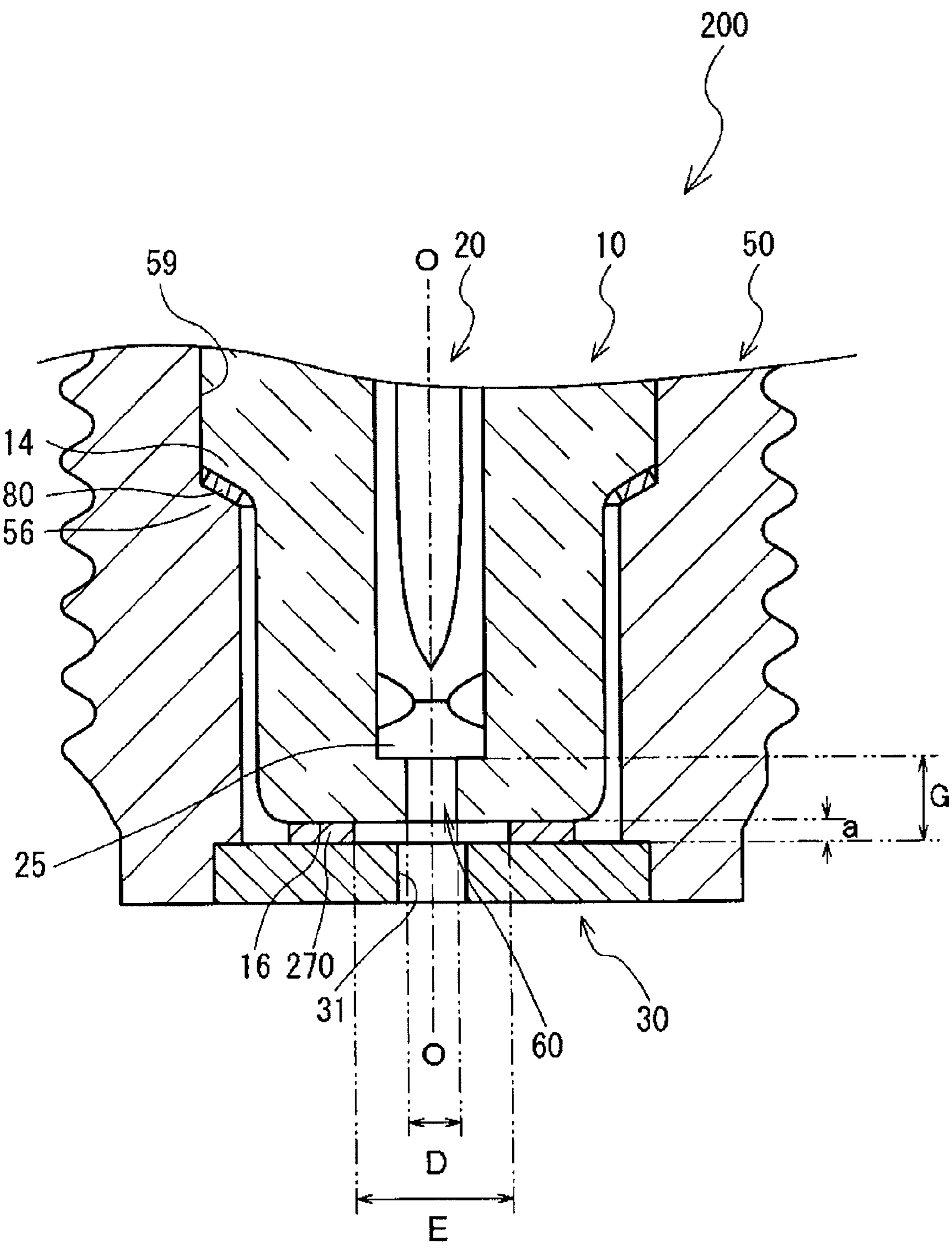
FIG. 3 is an enlarged partial section view of a plasma-jet spark plug 200 according to a second embodiment.

A second embodiment of the plasma-jet spark plug according to the present invention shall now be described with reference to FIG. 3. FIG. 3 is an enlarged partial section view of a plasma-jet spark plug 200 according to the second embodiment. The plasma-jet spark plug 200 according to the second embodiment (see FIG. 3) has a first packing 270 disposed in a clearance between the ground electrode 30 and the front end 16 of the insulator 10 of the plasma-jet spark plug 100 (refer to FIG. 2) according to the first embodiment. The first packing 270 is formed in an annular shape, using, for example, a cold-rolling steel plate. First packing 270 has an inner diameter E that is larger than the inner diameter D of the cavity 60, and at least one half of the difference between the inner diameter E of first packing 270 and the inner diameter D of the cavity 60 is larger than the first clearance dimension "a". That is, the dielectric breakdown voltage of a surface discharge and an aerial discharge, which are produced between the center electrode 20 and the ground electrode 30, is larger than that of the surface discharge produced between the center electrode 20 and the first packing 270. It is noted that the configuration of the plasma-jet spark plug 200 according to the second embodiment and of the plasma-jet spark plug 100 according to the first embodiment only differs in the presence/absence of the first packing 270. Therefore, the description of other parts in the plasma-jet spark plug 200, which is the same as those in the plasma-jet spark plug 100, will be omitted or simplified.

Similar to the first embodiment, the plasma jet spark plug 200 includes a metal shell 50 in which the insulator 10 is accommodated in the cylindrical hole 59 of the metal shell 50 and is held by crimping the crimp portion 53 in the manufacture process. The first packing 270 disposed in the first clearance has a lower hardness than that of the second packing 80 so that the second packing 80, that is inserted between the stepped portions 14 and 56, can deform without being affected by the first packing 270. By way of example and not limitation, the first packing 270 is made of a cold-rolled steel plate having a Vickers hardness of about 110 HV specified in JIS G3141. For the second packing 80, a nickel material used for electron tubes and having a Vickers hardness of about 200 HV specified in JIS H4501 may be employed.

Further, in order to seal between the ground electrode 30 and the front end 16 of the insulator 10 and to prevent leakage of the plasma energy through the first clearance, the thickness of the first packing 270 before being assembled in the plasma-jet spark plug 200 is equal to or slightly larger than the first clearance dimension "a". The second packing 80 prevents the outflow of the combustion gas through the cylindrical hole 59 of the metal shell 50. Therefore, the first packing 270 is appropriately selected to prevent a leakage of the plasma energy.

Thus, in the plasma-jet spark plug 200 according to the second embodiment, the first clearance can be reliably formed between the ground electrode 30 and the front end 16 of the insulator 10 by forming the first packing 270 therein. Although each specification regarding the dimension of the volume S of the cavity 60 and the spark discharge gap dimension G is the same as that of the first embodiment, the plasma energy is unlikely to leak to the second clearance and the amount of plasma energy leaking in the first clearance is also reduced through disposing the first packing 270 in the first clearance. Therefore, even if the first clearance dimension "a" is further enlarged, ignitability of the plasma-jet spark plug 200 is fully maintained. More particularly, when the first clearance dimension "a" is 0.8 mm or less, the excellent ignitability is obtained according to the results of Experiment 3 mentioned later.

As described above, providing the first clearance in the plasma-jet spark plug (the first embodiment), or providing the first packing 270 in the first clearance (the second embodiment), it is possible to prevent the insulator 10 from being damaged due to the influence of the heat stress at the time of use or the stress caused during the manufacturing process of the plasma-jet spark plug. In order to confirm as to whether or not the excellent ignitability is obtained by specifying each dimension as mentioned above, tests were conducted.

Experiment 1

First, in order to study a relation between the dimension "a" of the first clearance, the volume S of the cavity 60 and the ignitability, a test was conducted. Several kinds of plasma-jet spark plugs (test samples) were produced. Each test sample had one of four kinds of insulator (each having a different inner diameter D so that the volume S of the cavity was either 5, 10, 15 or 20 $mm^3$) with the first clearance dimension "a" ranging from 0.1 to 0.7 mm. The spark discharge gap dimension G in each sample was 3.0 mm, and the second clearance dimension "b" was 1.0 mm. Further, the first packing was not formed in the first clearance.

Each sample was mounted on a pressure chamber and subjected to ignitability test, charging the chamber with a mixture of air and C3H8 gas (air-fuel ratio: 22) to a pressure of 0.05 MPa (a gas-charging process). Next, the respective sample was connected to a power supply, which could supply energy of 150 mJ, so as to feed a high voltage thereto. Then, the success or failure of ignition of the air-fuel mixture was assessed (an ignition confirmation process). A detecting method for confirming the ignition includes measuring the pressure in the chamber with a pressure sensor and monitoring the pressure variation in the chamber. The ignition probability of the test sample was determined by performing the above series of process step 100 times. The test results are indicated with a graph in FIG. 4.

Figure 4:
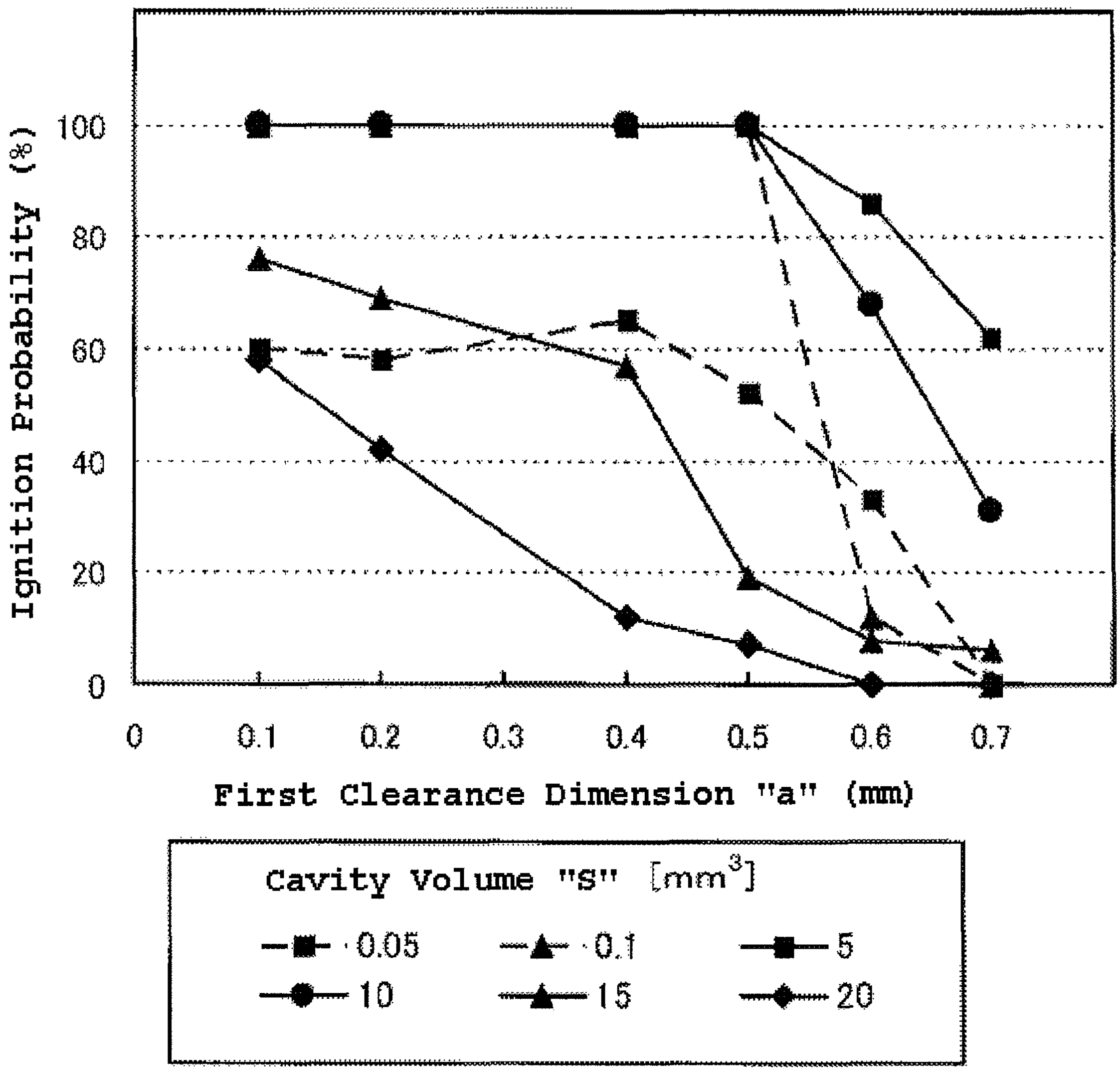
FIG. 4 is a graph showing a relation between the ignition probability and a first clearance dimension "a" as a function of a cavity volume S.

As seen from the graph in FIG. 4, when the first clearance dimension "a" increases, the ignition probability falls. Further, the samples having the cavity volume S of 0.1 $mm^3$, 5 $mm^3$ or 10 $mm^3$ had an ignition probability of 100% when the first clearance dimension "a" was 0.5 mm or less. This confirms that the ignition probability falls when the first clearance dimension "a" is larger than 0.5 mm. However, the samples having the cavity volume S of 0.05 $mm^3$, 15 $mm^3$ or 20 $mm^3$ did not have an ignition probability of 100% even when the first clearance dimension "a" was 0.1 mm. This shows that the ignition probability of 100% can be obtained without damaging the plasma-jet spark plug when the first clearance dimension "a" is greater than 0 to 0.5 mm or less and the volume S of the cavity is 0.1 or more to 10 $mm^3$ or less.

Experiment 2

Next, a test was conducted in order to study a relation between the spark discharge gap dimension G, the second clearance dimension "b" and the ignitability. In this test, a plurality of samples of the plasma-jet spark plug was produced. Each sample had an insulator in which the long leg portion was formed such that the second clearance dimension "b" was either 0.5, 1.0, 1.1 or 1.5 mm. The spark discharge gap dimension G was within the range from 1.0 to 4.0 mm. Each sample had the first clearance dimension "a" of 0.5 mm. The spark discharge gap dimension G was adjusted by changing the depth of the cavity. At this time, the inner diameter D of each sample was determined and adjusted so that the volume S of the cavity was kept constant at 10 $mm^3$ to compensate for the changes of the depth of the cavity. That is, this test was conducted using the limit value confirmed in Experiment 1, which obtained an ignitability of 100%. Further, similar to Experiment 1, the first packing was not disposed in the first clearance.

Similar to Experiment 1, these samples were mounted on a chamber and subjected to ignition probability test by charging the chamber with a mixture of air and $C_3H_8$ gas (air-fuel ratio: 22) to a pressure of 0.05 MPa. Further, the respective sample was connected to a power supply, which could supply energy of 150 mJ, and the ignition probability of the test sample was determined by performing the gas-charging process and the ignition confirmation process for 100 times. The test results are indicated with a graph in FIG. 5.

Figure 5:
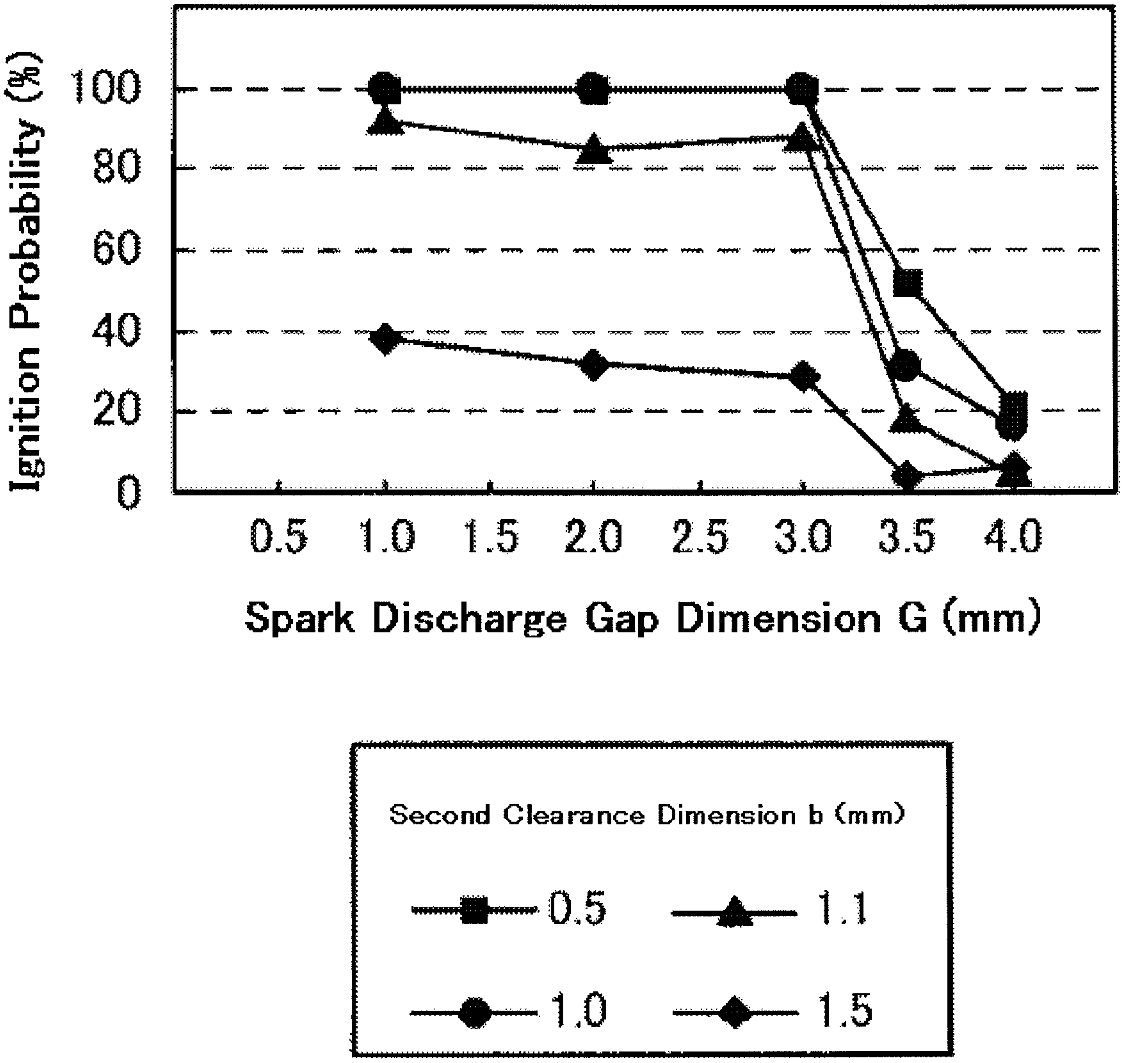
FIG. 5 is a graph showing a relation between the ignition probability and a spark discharge gap dimension G as a function of a second clearance dimension "b".

As seen from the graph in FIG. 5, the ignition probability of any sample drastically dropped when the spark discharge gap dimension G exceeded 3.0 mm. That is, when the spark discharge gap dimension G exceeds 3.0 mm, it is unlikely that the dielectric breakdown in the spark discharge gap occurs. It is noted that the test was not conducted when the spark discharge gap dimension G was less than 1.0 mm. The reason for this is that the depth of the cavity cannot fully be maintained so that the plasma cannot effectively be ejected in flame form. These tests show that the spark discharge gap dimension G should preferably range from 1.0 mm or more to 3.0 mm or less.

As seen from the graph in FIG. 5, when the spark discharge gap dimension G is 3.0 mm or less, the sample having the second clearance dimension "b" of 1.0 mm or less could reach an ignition probability of 100%. When the sample having the second clearance dimension "b" of 1.1 mm, the ignition probability was less than 100%, however, 80% or more of ignition probability was generally obtained. Further, for samples having the second clearance dimension "b" of 1.5 mm the ignition probability greatly dropped. This shows that excellent ignitability can be obtained when the second clearance dimension "b" of the plasma-jet spark plug is 1.1 mm or less. Furthermore, the second clearance dimension "b" is preferably 1.0 mm or less so as to obtain the ignition probability of 100%.

Experiment 3

Next, a test was conducted to confirm whether there is any improvement in the ignitability of the plasma-jet spark plug having the first packing in the first clearance thereof. In this test, a plurality of plasma-jet spark plugs was produced in which one of two kinds of insulator (one with the first packing placed in the first clearance, and the other without any first packing) was employed. The first clearance dimension "a" fell within the range from 0.3 to 0.9 mm. Each sample had the second clearance dimension "b" of 1.0 mm. The depth of the cavity of each sample was adjusted so that the spark discharge gap dimension G was set to 3.0 mm irrelevant of the first clearance dimension "a". Further, the inner diameter D of each sample was determined and adjusted so that the volume S of the cavity was kept at 10 $mm^3$. That is, this test was conducted using the limit value confirmed in Experiments 1 and 2, which obtained the ignitability of 100%.

Similar to Experiments 1 and 2, these samples were mounted on a chamber and subjected to ignition probability test by charging the chamber with a mixture of air and $C_3H_8$ gas (air-fuel ratio: 22) to a pressure of 0.05 MPa. Further, the sample was connected to a power supply, which could supply energy of 150 mJ, and ignition probability of the test sample was determined by performing the gas-charging process and the ignition confirmation process for 100 times. The test results are indicated with a graph in FIG. 6.

Figure 6:
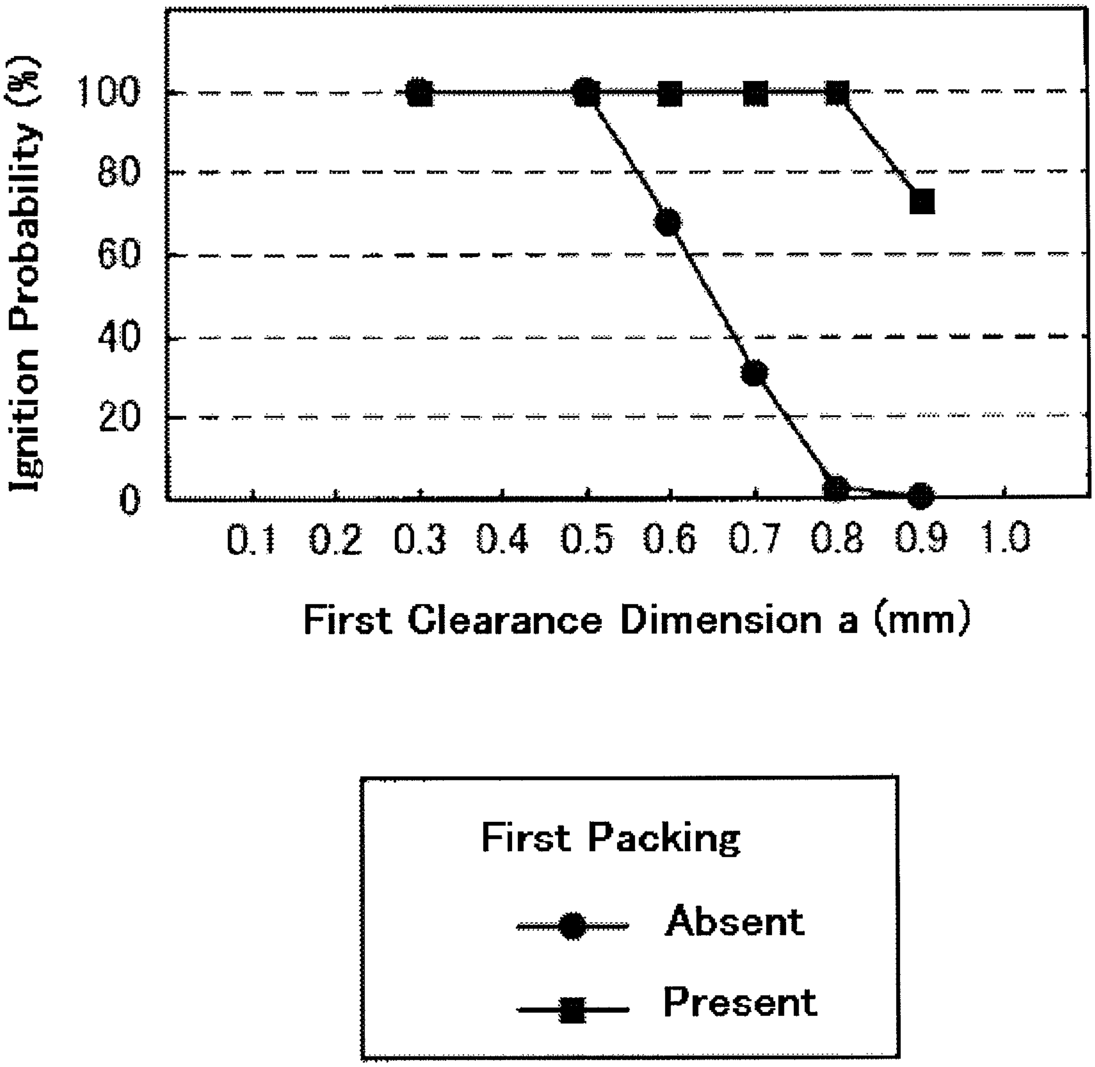
FIG. 6 is a graph showing a relation between the ignition probability and the first clearance dimension "a" as a function of the presence/absence of a first packing in the first clearance.

As seen from the graph in FIG. 6, in the sample which did not have the first packing in the first clearance, the ignition probability of 100% was obtained when the first clearance dimension "a" was 0.5 mm or less. Further, when the first clearance dimension "a" exceeds 0.5 mm, the ignition probability dropped, which was the same result as Experiment 1. On the other hand, in the sample having the first packing in the first clearance, the ignition probability of 100% was obtained as long as the first clearance dimension "a" was 0.8 mm or less.

Figure 7:
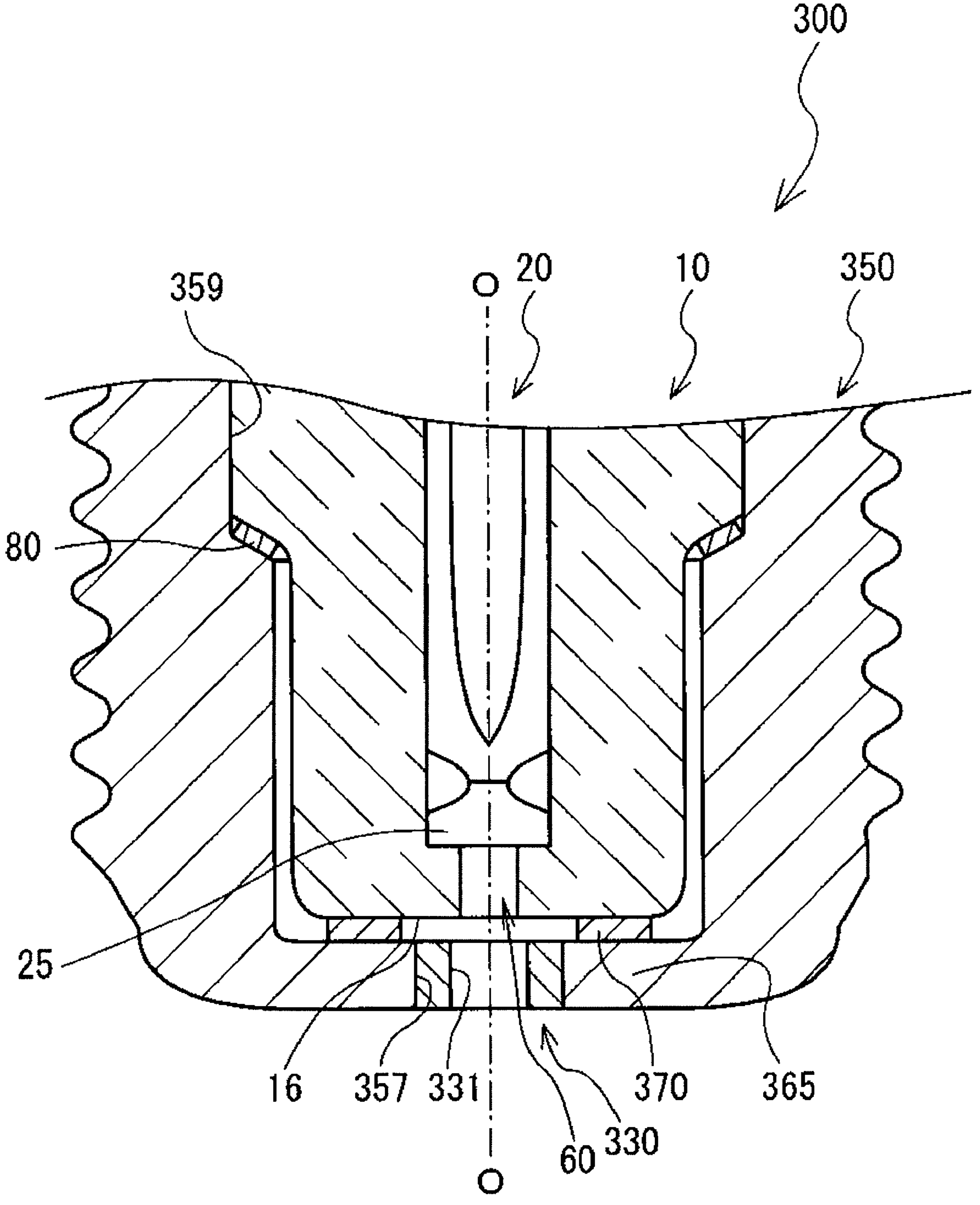
FIG. 7 is an enlarged partial section view of a plasma-jet spark plug 300 according to a modification.

The present invention is not limited to these exemplary embodiments. Various modification of the embodiment described above readily occur for those skilled in the art. The first and the second embodiments have a configuration where the opening of the cylindrical hole 59 of the metal shell 50 on the front end side is covered by the ground electrode 30. However, as in a plasma-jet spark plug 300 in FIG. 7, a peripheral edge of an opening of a cylindrical hole 359 on the front end side extends and is radially inwardly bent to form a joint portion 365, and a ground electrode 330 having an orifice 331 may be joined to an opening 357 provided in the center of the joint portion 365. Further, a first packing 370 may be disposed in a clearance between the joint portion 365 and the front end 16 of the insulator 10. Of course, the first packing 370 may be in contact with the ground electrode 330. Furthermore, in the case where there is no ground electrode 330 in the plasma-jet spark plug 300, the center opening 357 of the joint portion 365 of the metal shell 350 may serve as an orifice. Dimensions, such as a dimension of each clearance in the plasma-jet spark plug 300, shall be in accordance with that of the first and second embodiments.

In the first and second embodiments, the front end face 16 of the insulator 10 and the rear facing face of the ground electrode 30 opposing to the front end face 16 assume a plane shape and are disposed in parallel. However, the shape and the position of the front end face 16 and the rear facing face of the ground electrode 30 may be variously modified. For example, at least either the front end face 16 or the rear facing face of the ground electrode 30 may assume a curved surface or a stepped shape. Further, the front end face 16 and the rear facing face of the ground electrode 30 are not necessarily arranged parallel to each other. Since the purpose of the present invention is to prevent the leakage of the plasma into a gap between the front end face of the insulator and the ground electrode, the first clearance dimension "a" may be measured at the orifice 31 side (the innermost portion of the insulator in the radial direction) when the above modification is applied. Furthermore, the second clearance dimension "b" may be measured on the front end side (except for a C chamfering or an R chamfering portion), as shown in FIG. 2.

In the tests for confirming the effect of the present invention, the volume S varies depending on the depth of the cavity 60 or the diameter of the front hole portion 61. However, the volume S is not necessarily defined in such a manner. The volume S may be defined by the cavity 60 which is formed by the inner circumference face of the front hole portion 61 and the front end face 26 of the center electrode 20 as in the first and second embodiments (refer to FIGS. 2 and 3). Although it is not illustrated in the specification, the cavity 60 may include a part of the electrode holding region 15 located on the rear end side with respect to the front hole portion 61 and having a diameter larger than the inner diameter of the front hole portion 61. Further, the inner diameter of the front hole portion 61 may be adequately modified. Of course, in that case, the opening diameter of the orifice 31 of the ground electrode 30 is preferably made larger than the inner diameter of the front hole portion 61 to thereby prevent the leakage of the plasma into the first clearance. The written description above uses specific embodiments to disclose the invention, including the best mode, and also to enable any person skilled in the art to make and use the invention. While the invention has been described in terms of various specific embodiments, those skilled in the art will recognize that the invention can be practiced with modifications within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A plasma-jet spark plug, comprising:

a center electrode having a front end face;

an insulator having an axial bore which extends in an axial direction, said insulator accommodating said front end face of the center electrode therein and holding the center electrode;

a cavity formed at the front end side of the insulator said cavity having a shape defined by an inner circumference face of the axial bore and either a front end face of the center electrode or a plane surface including the front end face;

a metal shell holding the insulator by surrounding a radial circumference of the insulator; and a ground electrode joined to the metal shell to provide electrical connection thereto, the ground electrode being disposed at the front end side with respect to the insulator and having an opening portion for providing communication between the cavity and the outside of the spark plug, wherein a plasma can be produced in the cavity along with a spark discharge between the center electrode and the ground electrode, wherein the insulator and the ground electrode are disposed apart from each other in the axial direction, and wherein the following relations are satisfied:

$$0<a<=0.5 \text{ [mm] and } 0.1<=S<=10 \text{ [mm}^3\text{]}$$

where "a" is a dimension of a clearance between the insulator and the ground electrode in the axial direction; and "S" is a volume of the cavity (60).

2. The plasma-jet spark plug according to claim 1, wherein in a region where the cavity is formed in the axial direction, the insulator and the metal shell are disposed apart from each other in a radial direction perpendicular to the axial direction, and wherein the following relation is satisfied:

$$b<=1.1 \text{ [mm]}$$

where "b" is a dimension of a clearance between the insulator and the metal shell in the radial direction perpendicular to the axial direction.

3. The plasma-jet spark plug according to claim 2, wherein the "b" satisfies the following relation:

$$0.1<=b<=1.1 \text{ [mm]}.$$

4. A plasma-jet spark plug, comprising:

a center electrode;

an insulator having an axial bore which extends in an axial direction, the insulator accommodating a front end face of the center electrode therein and holding the center electrode;

a cavity formed at the front end side of the insulator and assuming a concave shape defined by an inner circumference face of the axial bore and either a front end face of the center electrode or a plane surface including the front end face;

a metal shell holding the insulator by surrounding a radial circumference of the insulator; and a ground electrode joined to the metal shell to provide electrical connection thereto, the ground electrode being disposed at the front end side with respect to the insulator and having an opening portion for providing communication between the cavity and the outside of the spark plug, wherein a plasma can be produced in the cavity along with a spark discharge between the center electrode and the ground electrode, wherein at least either a joint portion of the metal shell joined to the ground electrode or the ground electrode is disposed apart from the insulator in the axial direction, and wherein a first packing is disposed in a clearance between at least either the joint portion of the metal shell joined to the ground electrode or the ground electrode and the insulator so as to adhere thereto.

5. A plasma-jet spark plug according to claim 4, wherein the insulator comprises an insulator stepped portion having a rear end side thereof with a lager diameter than a front end side thereof, wherein the insulator stepped portion is formed in a portion of an outer circumference face of the insulator which is accommodated radially inward of a fitting portion provided at a front end side of the metal shell, wherein a metal fitting stepped portion of the metal shell bulging out in a radially inward direction is formed in an inner circumference face of the metal shell so as to face the insulator stepped portion, wherein a second packing is disposed between the insulator stepped portion and the metal fitting stepped portion so as to adhere thereto, and wherein a hardness of the second packing is higher than that of the first packing.

6. A plasma-jet spark plug according to claim 4, wherein the following relations are satisfied:

$$0<a<=0.8 \text{ [mm] and } 0.1<=S<=10 \text{ [mm}^3\text{]}$$

where "a" is a dimension of a clearance in the axial direction between at least either the joint portion of the metal shell joined to the ground electrode or the ground electrode and the insulator; and "S" is a volume of the cavity.

7. A plasma-jet spark plug according to any one of claims 1 to 6, wherein the following relation is satisfied:

$$1.0<=G<=3.0 \text{ [mm]}$$

where "G" is a dimension of a gap between the center electrode and the ground electrode in the axial direction.

* * * * *